United States Patent
Tanaka (10) Patent No.: US 11,283,316 B2
(45) Date of Patent: Mar. 22, 2022

(54) ROTOR AND ROTATING ELECTRICAL MACHINE

(71) Applicant: HONDA MOTOR CO., LTD., Tokyo (JP)

(72) Inventor: Shuhei Tanaka, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 75 days.

(21) Appl. No.: 16/804,010

(22) Filed: Feb. 28, 2020

(65) Prior Publication Data

US 2020/0287432 A1 Sep. 10, 2020

(30) Foreign Application Priority Data

Mar. 4, 2019 (JP) .............................. JP2019-038540

(51) Int. Cl.
| H02K 1/32 | (2006.01) |
| H02K 1/27 | (2006.01) |
| H02K 1/28 | (2006.01) |
| H02K 1/278 | (2022.01) |

(52) U.S. Cl.
CPC ............. *H02K 1/32* (2013.01); *H02K 1/278* (2013.01); *H02K 1/28* (2013.01)

(58) Field of Classification Search
CPC ............ H02K 1/32; H02K 1/28; H02K 1/278; H02K 9/19; H02K 1/2753; H02K 1/274; H02K 1/30
See application file for complete search history.

(56) References Cited

U.S. PATENT DOCUMENTS

| 2013/0278091 A1 | 10/2013 | Ohashi et al. |
| 2016/0020673 A1 | 1/2016 | Pal |
| 2016/0149450 A1* | 5/2016 | Horii .................... H02K 1/2766 310/54 |
| 2018/0123411 A1* | 5/2018 | Kawaguchi ............. H02K 1/28 |

FOREIGN PATENT DOCUMENTS

| CN | 2742662 | 11/2005 |
| CN | 2757414 | 2/2006 |
| CN | 102983679 | 3/2013 |
| CN | 103348571 | 10/2013 |

(Continued)

OTHER PUBLICATIONS

Machine Translation, Shibayama, JP-2019004533-A, Jan. 2019. (Year: 2019).*

(Continued)

*Primary Examiner* — Thomas Truong
(74) *Attorney, Agent, or Firm* — Amin, Turocy & Watson, LLP (57) ABSTRACT

A rotor includes a rotor core, a shaft rotated integrally with the rotor core and having an axial center cooling path through which a coolant is able to flow, a plate member having a first flow path which flows the coolant flowing through the axial center cooling path to an outer circumferential section of the rotor core, a permanent magnet disposed on the outer circumferential section of the rotor core, a filament winding layer wound on an outer circumferential section of the permanent magnet, and a cylindrical body disposed on an outer circumferential section of the filament winding layer.

7 Claims, 6 Drawing Sheets

(56) References Cited

FOREIGN PATENT DOCUMENTS

| | | |
|---|---|---|
| CN | 104143892 | 11/2014 |
| CN | 105610260 | 5/2016 |
| CN | 205248951 | 5/2016 |
| CN | 207652160 | 7/2018 |
| CN | 109347291 | 2/2019 |
| EP | 2961043 | 12/2015 |
| JP | 2003-018775 | 1/2003 |
| JP | 2005-304188 | 10/2005 |
| JP | 2008-219965 | 9/2008 |
| JP | 2009-081953 | 4/2009 |
| JP | 2009-171785 | 7/2009 |
| JP | 2017-028837 | 2/2017 |
| JP | 2019-004533 | 1/2019 |
| JP | 2019004533 A * | 1/2019 |
| WO | 2012/086228 | 6/2012 |
| WO | 2018/062350 | 4/2018 |
| WO | 2018/198866 | 11/2018 |
| WO | 2018/221008 | 12/2018 |

OTHER PUBLICATIONS

Japanese Office Action for Japanese Patent Application No. 2019-038540 dated Jan. 12, 2021.
Chinese Office Action for Chinese Patent Application No. 202010119657.5 dated Jan. 4, 2022.

* cited by examiner

ROTOR AND ROTATING ELECTRICAL MACHINE

CROSS-REFERENCE TO RELATED APPLICATION

Priority is claimed on Japanese Patent Application No. 2019-038540, filed Mar. 4, 2019, the content of which is incorporated herein by reference.

BACKGROUND OF THE INVENTION

Field of the Invention

The present invention related to a rotor and a rotating electrical machine.

Description of Related Art

In the related art, a rotating electrical machine is used as a power source of a hybrid automobile or an electric automobile. In the rotating electrical machine, permanent magnets are disposed in an outer circumferential section of a rotor core. Since the permanent magnets generate heat while rotating, various technologies of cooling permanent magnets by supplying a coolant into a rotor core have been proposed.

For example, International Publication No. 2012/086228 discloses a configuration of a so-called embedded magnet type rotating electrical machine (IPM) including a rotor, a rotating body inserted through a central section of the rotor, a sleeve member provided between the rotor and the rotating body, and a groove formed between the rotating body and the sleeve member, wherein permanent magnets are buried in holes provided in a rotor core. According to the technology disclosed in International Publication No. 2012/086228, the rotor core and the permanent magnets can be efficiently cooled by causing oil to flow through the groove between the rotary shaft and the rotor.

SUMMARY OF THE INVENTION

However, in the technology disclosed in International Publication No. 2012/086228, when the technology is applied to a surface magnet type rotating electrical machine (SPM) in which permanent magnets are disposed on an outer circumferential surface of a rotor core, the permanent magnets may not be efficiently cooled because a distance between a groove formed in a rotating body and the permanent magnets is increased. In addition, there is a concern whether the permanent magnets are reliably fixed to the rotor core.

Incidentally, in the SPM, as a method of fixing the permanent magnets to the outer circumferential surface of the rotor core, a method of winding a filament winding on an outer circumferential section of the rotor is known. However, in recent years, more secure fixing has come to be required according to an increase in rotational speed of the rotor.

An aspect of the present invention is directed to providing a rotor having an improved cooling efficiency while reliably fixing permanent magnets disposed on an outer circumferential surface of a rotor core, and a rotating electrical machine using the rotor.

(1) A rotor according to the present invention includes a rotor core; a shaft rotated integrally with the rotor core and having an axial center cooling path through which a coolant is able to flow; a plate member having a first flow path which flows the coolant flowing through the axial center cooling path to an outer circumferential section of the rotor core; a permanent magnet disposed on the outer circumferential section of the rotor core; a filament winding layer wound on an outer circumferential section of the permanent magnet; and a cylindrical body disposed on an outer circumferential section of the filament winding layer.

(2) In the aspect of the above-mentioned (1), the filament winding layer may be wound in a circumferential direction of the rotor core, and an inner circumferential side flow path in communication with the first flow path may be provided in an inner circumferential section of the cylindrical body.

(3) In the aspect of the above-mentioned (2), the inner circumferential side flow path may be formed in a spiral shape.

(4) In the aspect of the above-mentioned (2) or (3), the plate member may include an oil path plate disposed in a middle section of the rotor in an axial direction, and, as advancing from a downstream side toward an upstream side in a rotating direction of the rotor, the inner circumferential side flow path may be inclined so as to direct toward an outside in the axial direction from a central section side in the axial direction.

(5) In the aspect of any one of the above-mentioned (2) to (4), an outer circumferential side flow path formed in a spiral shape may be provided in an outer circumferential section of the cylindrical body.

(6) In the aspect of the above-mentioned (5), the inner circumferential side flow path and the outer circumferential side flow path may be formed to be parallel to each other.

(7) In the aspect of any one of the above-mentioned (1) to (6), the cylindrical body may be a non-magnetic body.

(8) A rotating electrical machine according to the present invention may include the rotor according to the aspect of any one of the above-mentioned (1) to (7); and a stator disposed on an outer circumferential section of the rotor.

According to the aspect of the above-mentioned (1), since the filament winding layer is wound on the outer circumferential surface of the permanent magnet, the permanent magnet can be held by the outer circumferential section of the rotor core. Since the cylindrical body is further disposed on the outer circumferential section of the filament winding layer, fraying of the filament winding layer can be minimized since the cylindrical body holds the outer circumference of the filament winding layer. Accordingly, the permanent magnet can be more reliably fixed to the rotor core. In addition, contact of the filament winding layer with the stator due to rotation of the rotor can be reliably prevented. Accordingly, it is possible to provide a rotor appropriate for high speed rotation in contrast to in the related art.

Since the plate member has the first flow path, the coolant flowing through the axial center cooling path is supplied to the outer circumferential section of the rotor core through the first flow path. Further, the coolant supplied to the outer circumferential section of the rotor core enters between the fibers of the filament winding layer. Accordingly, the permanent magnet disposed inside the filament winding layer can be efficiently cooled from the outer circumferential section.

Accordingly, it is possible to provide a rotor with an improved cooling efficiency while reliably fixing the permanent magnet disposed on the outer circumferential surface of the rotor core.

According to the aspect of the above-mentioned (2), since the inner circumferential side flow path in communication with the first flow path is provided in the inner circumferential section of the cylindrical body, the coolant flowing through the axial center cooling path is supplied to the inner circumferential side flow path through the first flow path. Accordingly, the coolant can be actively supplied to between the cylindrical body and the filament winding layer. Accordingly, the permanent magnet disposed inside the filament winding layer and the filament winding layer can be efficiently cooled from the outer circumferential section.

According to the aspect of the above-mentioned (3), since the inner circumferential side flow path is formed in a spiral shape, the coolant supplied to the inner circumferential side flow path is moved from one side toward the other side in the axial direction while moving in the circumferential direction due to rotation of the rotor. Accordingly, a distribution efficiency of the coolant supplied to the inner circumferential side flow path can be improved. Accordingly, a cooling efficiency of the rotor can be improved.

According to the aspect of the above-mentioned (4), since the oil path plates are disposed on the middle section of the rotor in the axial direction, the coolant is supplied to the outer circumferential section of the rotor through the middle section of the rotor core. Meanwhile, as advancing from a downstream side toward an upstream side in a rotating direction of the rotor, the inner circumferential side flow path is inclined so as to direct toward an outside in the axial direction from a central section side in the axial direction. For this reason, the coolant supplied to the inner circumferential side flow path is moved outward from the side of the middle section of the rotor along the inclination due to an inertial force according to rotation of the rotor. Accordingly, the coolant supplied to the middle section in the axial direction can be actively discharged toward the outside in the axial direction by the oil path plates. Accordingly, a cooling efficiency of the rotor can be improved.

According to the aspect of the above-mentioned (5), since the outer circumferential side flow path formed in a spiral shape is provided in the outer circumferential section of the cylindrical body, for example, in the rotating electrical machine using the rotor, the coolant entering the air gap between the rotor and the stator can be discharged outside of the air gap along the outer circumferential side flow path. Accordingly, occurrence of a friction torque in the rotating electrical machine due to entry of the coolant into the air gap can be minimized.

According to the aspect of the above-mentioned (6), since the inner circumferential side flow path and the outer circumferential side flow path are formed to be parallel to each other, in both of the inner circumferential section and the outer circumferential section of the cylindrical body, the coolant can flow from the side of the middle section in the axial direction toward the outward side in the axial direction according to rotation of the rotor. Accordingly, it is possible to provide a high performance rotor in which a cooling efficiency of the rotor is improved by improving a distribution efficiency of the coolant in the inner circumferential side flow path, the coolant inadvertently entering into the air gap is rapidly discharged to the outside of the air gap through the outer circumferential side flow path, and occurrence of a friction torque in the rotating electrical machine using the rotor is minimized.

According to the aspect of the above-mentioned (7), since the cylindrical body is a non-magnetic body, a magnetic flux leakage can be minimized by providing the cylindrical body. Accordingly, it is possible to provide a high efficiency rotor in which a decrease in magnetic efficiency is minimized.

According to the rotating electrical machine of the aspect of the above-mentioned (8), it is possible to provide a high performance rotating electrical machine including a rotor with an improved cooling efficiency while reliably fixing the permanent magnet disposed on the outer circumferential surface of the rotor core.

DETAILED DESCRIPTION OF THE INVENTION

Hereinafter, embodiments of the present invention will be described with reference to the accompanying drawings.

First Embodiment (Rotating Electrical Machine)

Figure 1:
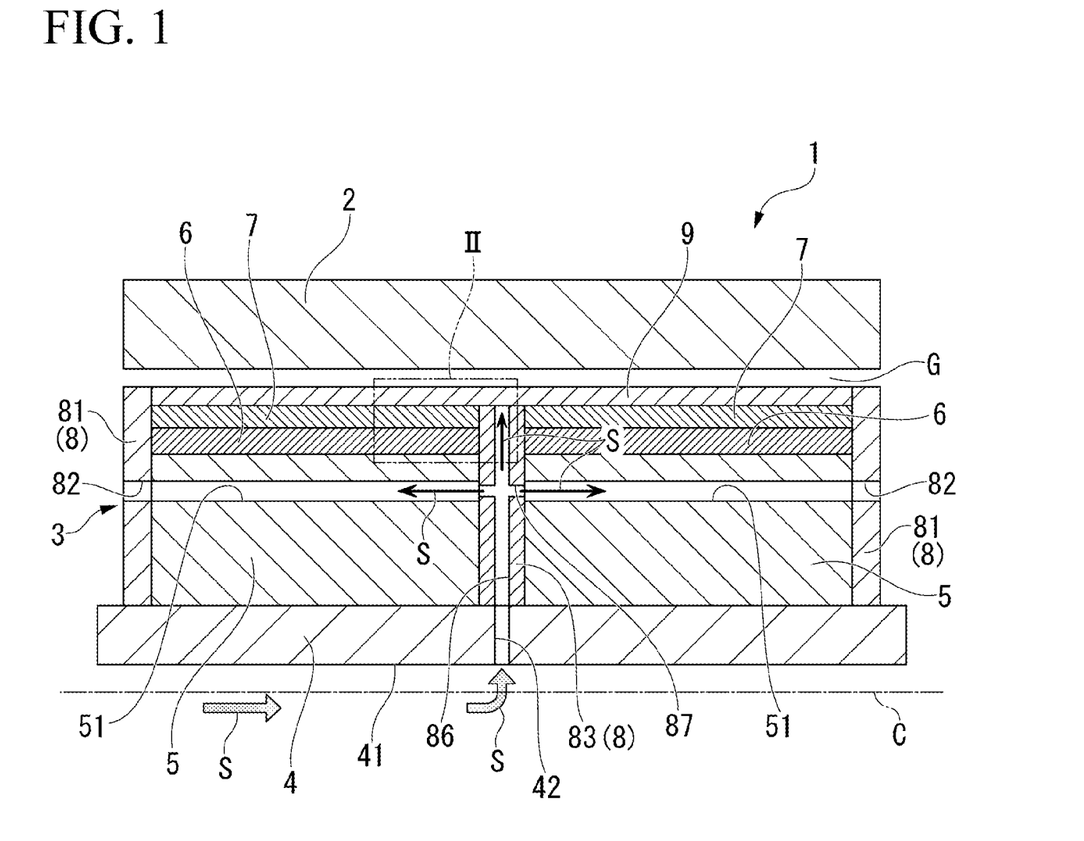
FIG. 1 is a partial cross-sectional view of a rotating electrical machine according to a first embodiment.
Figure 2:
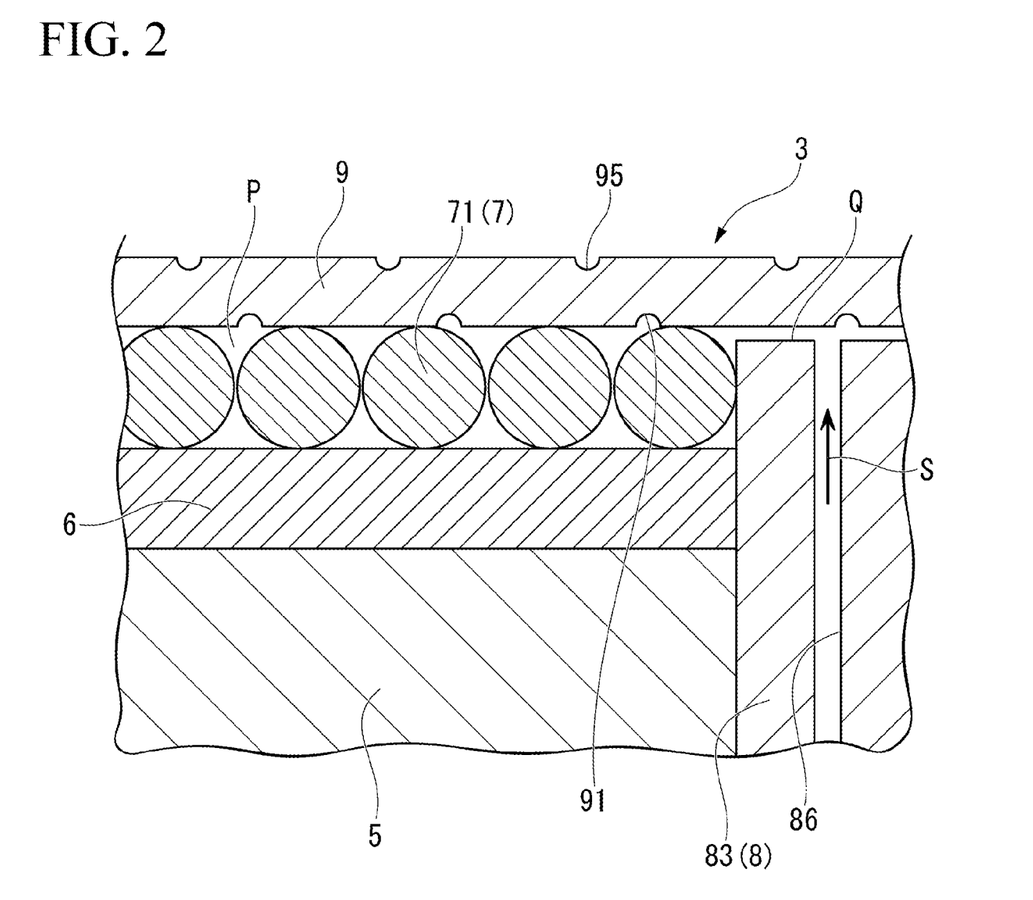
FIG. 2 is an enlarged view of a portion II in FIG. 1.

FIG. 1 is a partial cross-sectional view of a rotating electrical machine 1 according to a first embodiment. In FIG. 1, a configuration the same as that of an upper half is provided as a lower half under an axis C. FIG. 2 is an enlarged view of a portion II in FIG. 1.

The rotating electrical machine 1 is a traveling motor mounted on a vehicle such as a hybrid automobile, an electric automobile, or the like. However, the configuration of the present invention is not limited to a traveling motor, and may also be applied as a generating motor or a motor for other uses, or a rotating electrical machine (including a generator) for other uses than vehicles.

As shown in FIG. 1, the rotating electrical machine 1 includes a stator 2 and a rotor 3.

(Stator)

The stator 2 is formed in an annular shape about the axis C. An outer circumferential section of the stator 2 is fixed to an inner wall of a case (not shown). The stator 2 is disposed inside the case in a state in which a part of the stator is immersed in a coolant S. Further, as the coolant S, an automatic transmission fluid (ATF) or the like that is a working oil used for lubrication, power transmission, or the like, of a transmission is appropriately used. A coil (not shown) is mounted on the stator 2.

In the following description, a direction along the axis C of the stator 2 may be simply referred to as an axial direction, a direction perpendicular to the axis C may be referred to as a radial direction, and a direction around the axis C may be referred to as a circumferential direction.

(Rotor)

The rotor 3 is disposed on a side inward in the radial direction from the stator 2 with an interval therebetween. The rotor 3 is formed in a cylindrical shape about the axis C. The rotor 3 is configured to be rotatable around the axis C. The rotor 3 includes a shaft 4, a rotor core 5, permanent magnets 6, a filament winding layer 7, a plate member 8 and a cylindrical body 9. Further, in the drawings after FIG. 1, for the sake of clarity, thicknesses of the filament winding layer 7 and the plate member 8 are shown in an exaggerated manner.

(Shaft)

The shaft 4 is disposed coaxially with the axis C. The shaft 4 is formed in a cylindrical shape about the axis C. The shaft 4 is rotatably supported by a case (not shown) configured to accommodate the stator 2 and the rotor 3 via a bearing attached to the case. An axial center cooling path 41 and radial flow paths 42, through which the coolant S can flow, are formed in the shaft 4. The axial center cooling path 41 passes through the shaft 4 in the axial direction to be coaxial with the axis C. The radial flow paths 42 are provided in a middle section of the shaft 4 in the axial direction. The radial flow paths 42 extend in the radial direction. The radial flow paths 42 allow the axial center cooling path 41 and the outer circumferential section of the shaft 4 to communicate with each other. The plurality of radial flow paths 42 are provided in the circumferential direction.

(Rotor Core)

The rotor core 5 is provided on the outer circumferential section of the shaft 4. The rotor core 5 is formed in an annular shape. The rotor core 5 is configured to be rotatable integrally with the shaft 4 around the axis C. The rotor core 5 has an internal flow path 51. The internal flow path 51 passes through the rotor core 5 in the axial direction. The coolant S can flow through the internal flow path 51. In the embodiment, the rotor core 5 is split into a pair of parts in the axial direction. The pair of rotor cores 5 have the same configuration.

(Permanent Magnet)

The permanent magnets 6 are disposed on the outer circumferential surface of the rotor core 5. Further, a concave section or the like configured to position the permanent magnets 6 in the circumferential direction may be provided in the outer circumferential surface of the rotor core 5. The permanent magnets 6 extend in the axial direction. The plurality of permanent magnets 6 are provided in the circumferential direction. The permanent magnets 6 are, for example, rare-earth magnets. As the rare-earth magnet, for example, a neodymium magnet, a samarium cobalt magnet, a praseodymium magnet, or the like, may be exemplified.

(Filament Winding Layer)

The filament winding layer 7 is provided on the outer circumferential sections of the permanent magnets 6. Specifically, as shown in FIG. 2, the filament winding layer 7 is formed by spirally winding filament fibers 71 obtained by forming a material such as a glass fiber, a resin, or the like, into a fiber form in the circumferential direction of the rotor core 5. The filament fiber 71 is formed in a circular cross-sectional shape. The filament winding layer 7 fixes the permanent magnets 6 to the outer circumferential surface of the rotor core 5 by being wound on the outer circumferential sections of the permanent magnets 6. Further, the filament winding layer 7 may be laminated by being wound in the radial direction of the rotor core 5 a plurality of times.

(Plate Member)

As shown in FIG. 1, the plate members 8 are provided on end portions and a middle section of the rotor core 5 in the axial direction. Specifically, the plate member 8 includes end plates 81 and oil path plates 83.

The end plates 81 are provided on end portions disposed on one side and the other side of the rotor core 5 in the axial direction and directed toward sides outward from the rotor core 5, respectively. The end plate 81 is formed in an annular shape about the axis C. An inner end portion of the end plate 81 in the radial direction abuts the outer circumferential section of the shaft 4. An end surface of the end plate 81 in the axial direction directed toward the middle section of the rotor 3 abuts an end surface of the rotor core 5 in the axial direction directed outward. Discharge holes 82 passing through the end plates 81 in the axial direction are formed in the end plates 81. The discharge holes 82 are in communication with the internal flow path 51 of the rotor core 5. The discharge holes 82 can discharge the coolant S flowing through the internal flow path 51 outward in the axial direction of the rotor 3.

The oil path plates 83 are provided in the middle section of the rotor core 5 in the axial direction.

Specifically, the oil path plates 83 are provided between the pair of rotor cores 5 in the axial direction. The oil path plates 83 are formed in an annular shape about the axis C. An inner end portion of the oil path plates 83 in the radial direction abuts the outer circumferential section of the shaft 4. Outer end portions of the oil path plates 83 in the radial direction terminates more inward than an outer circumferential part of the filament winding layer 7 in the radial direction (see also FIG. 2). Both end surfaces of the oil path plates 83 in the axial direction abut the end surfaces of the pair of rotor cores 5 in the axial direction directed toward the middle section. The oil path plates 83 have first flow paths 86 and second flow paths 87.

The first flow paths 86 pass through the oil path plates 83 in the radial direction. The inner end portion of the first flow path 86 in the radial direction is in communication with the radial flow paths 42 of the shaft 4. The outer end portions of the first flow paths 86 in the radial direction are in communication with the outer circumferential sections of the oil path plates 83. The first flow path 86 enables the coolant S flowing through the radial flow paths 42 to flow to the outer circumferential section of the rotor core 5. The plurality of first flow paths 86 are provided in the circumferential direction.

The second flow paths 87 pass through the oil path plates 83 in the axial direction. The second flow path 87 is in communication with the first flow path 86. End portions on one side and the other side of the second flow path 87 in the axial direction are in communication with the internal flow paths 51 formed in the rotor cores 5, respectively. The second flow path 87 enables the coolant S flowing through the first flow path 86 to flow through the internal flow path 51 of the rotor core 5. The plurality of second flow paths 87 are provided in the circumferential direction.

(Cylindrical Body)

The cylindrical body 9 is disposed on the outer circumferential section of the filament winding layer 7. The cylindrical body 9 is formed in a cylindrical shape about the axis C. The cylindrical body 9 is formed of a material of a non-magnetic body such as a titanium, stainless or nickel alloy. The cylindrical body 9 is fixed to the outer circumferential section of the filament winding layer 7 through, for example, press-fitting. As shown in FIG. 2, the inner circumferential surface of the cylindrical body 9 abuts the filament winding layer 7. Accordingly, cavity portions P are formed between the inner circumferential surface of the cylindrical body 9 and the filament fibers 71 neighboring in the axial direction. In addition, a gap Q is provided between the inner circumferential surface of the cylindrical body 9 and the outer end portions of the oil path plates 83 in the radial direction. The cylindrical body 9 has an inner circumferential side flow path 91 and an outer circumferential side flow path 95.

Figure 3:
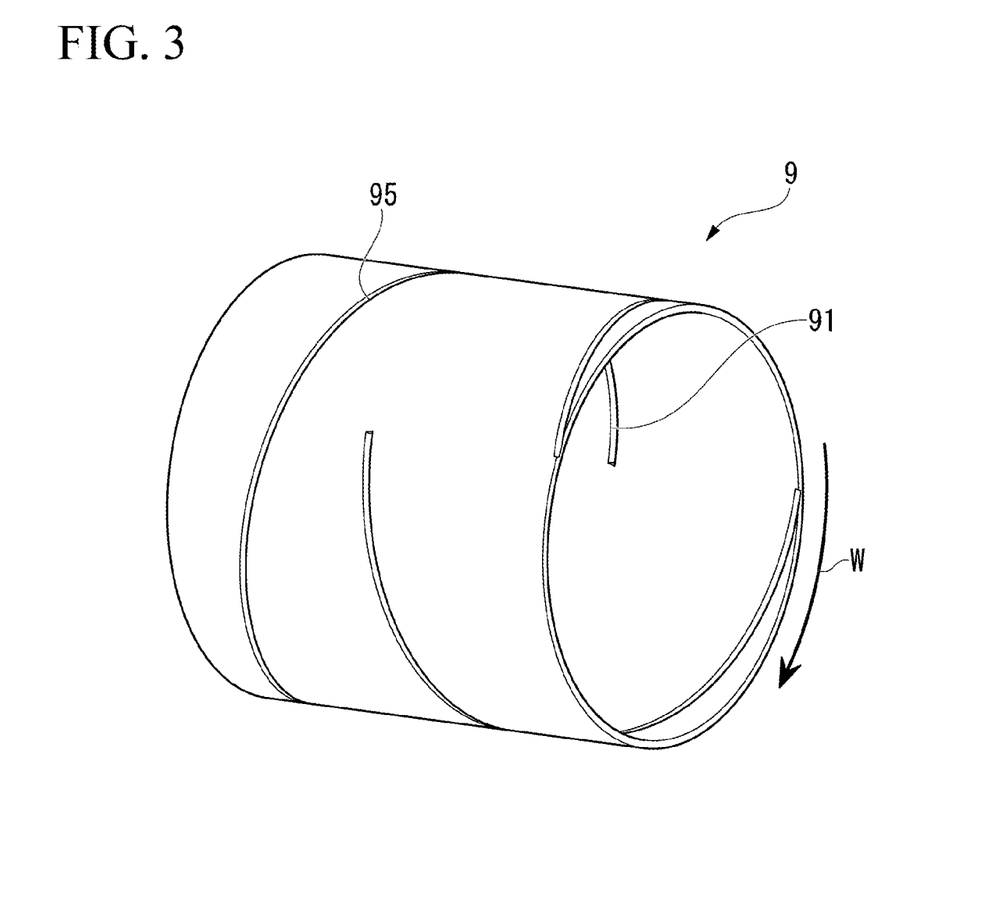
FIG. 3 is a perspective view of a cylindrical body according to the first embodiment.
Figure 4:
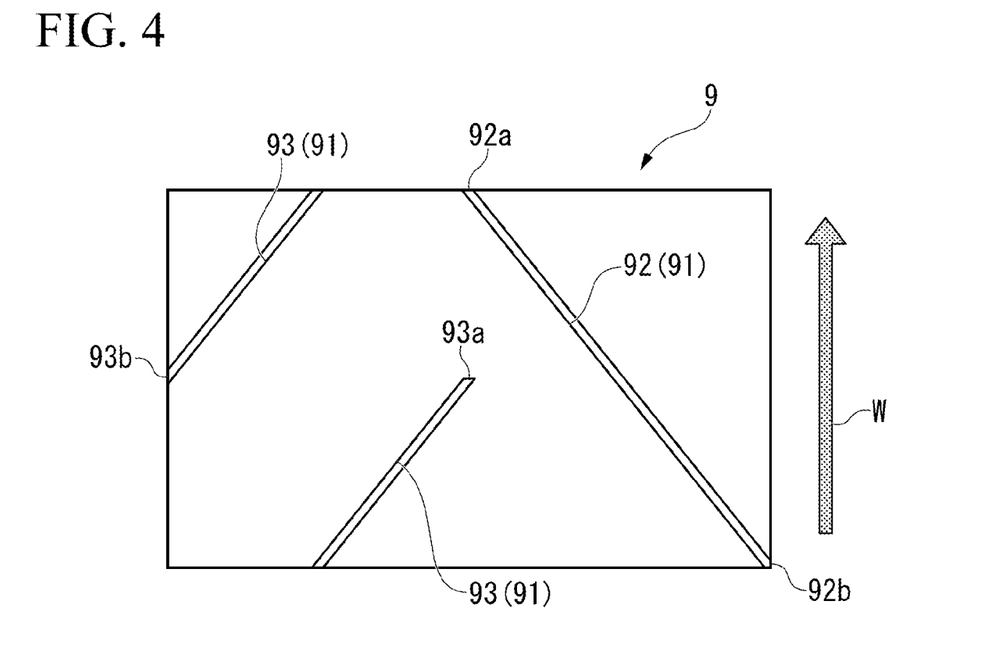
FIG. 4 is a developed view of an inner circumferential surface of the cylindrical body according to the first embodiment.

FIG. 3 is a perspective view of the cylindrical body 9 according to the first embodiment. FIG. 4 is a developed view of the inner circumferential surface of the cylindrical body 9 according to the first embodiment.

As shown in FIG. 3, the inner circumferential side flow path 91 is formed in the inner circumferential surface of the cylindrical body 9. The inner circumferential side flow path 91 is a groove recessed outward from the inner circumferential surface of the cylindrical body 9 in the radial direction. The inner circumferential side flow path 91 is formed in a spiral shape. Specifically, as advancing from a downstream side toward an upstream side in a rotating direction of the rotor 3 (a direction of an arrow W in FIG. 3), the inner circumferential side flow path 91 is inclined so as to direct toward an outside in the axial direction from a central section side in the axial direction. As shown in FIG. 2, the coolant S supplied from the first flow paths of the oil path plates 83 can flow through the inner circumferential side flow path 91.

As shown in FIG. 4, the inner circumferential side flow path 91 has a first inner circumferential side flow path 92 formed on one side in the axial direction, and a second inner circumferential side flow path 93 formed on the other side in the axial direction.

A starting point 92*a* of the first inner circumferential side flow path 92 is provided on the middle section in the axial direction. An end point 92*b* of the first inner circumferential side flow path 92 is provided on an end portion on one side in the axial direction. The first inner circumferential side flow path 92 extends spirally from the starting point 92*a* to the end point 92*b*. As advancing from a downward side toward an upward side in the rotating direction (the direction of the arrow W in FIG. 4) of the rotor 3, the first inner circumferential side flow path 92 is inclined so as to be directed toward the end point 92*b* from the starting point 92*a*. The first inner circumferential side flow path 92 makes one round from the starting point 92*a* to the end point 92*b* in the circumferential direction.

At least a part of the second inner circumferential side flow path 93 is provided on the other side of the first inner circumferential side flow path 92 in the axial direction. A starting point 93*a* of the second inner circumferential side flow path 93 is provided on the middle section in the axial direction. An end point 93*b* of the second inner circumferential side flow path 93 is provided on an end portion on the other side in the axial direction. The second inner circumferential side flow path 93 extends spirally from the starting point 93*a* to the end point 93*b*. As advancing from a downstream side toward an upstream side in the rotating direction of the rotor 3, the second inner circumferential side flow path 93 is inclined so as to be directed toward the end point 93*b* from the starting point 93*a*. The second inner circumferential side flow path 93 makes one round from the starting point 93*a* to the end point 93*b* in the circumferential direction.

Returning to FIG. 3, the outer circumferential side flow path 95 is formed in the outer circumferential surface of the cylindrical body 9. The outer circumferential side flow path 95 is a groove recessed inward from the outer circumferential surface of the cylindrical body 9 in the radial direction. The outer circumferential side flow path 95 is formed in a spiral shape substantially parallel to the inner circumferential side flow path 91. As shown in FIG. 1, the coolant S entering an air gap G between the stator 2 and the rotor 3 can flow through the outer circumferential side flow path 95.

Figure 5:
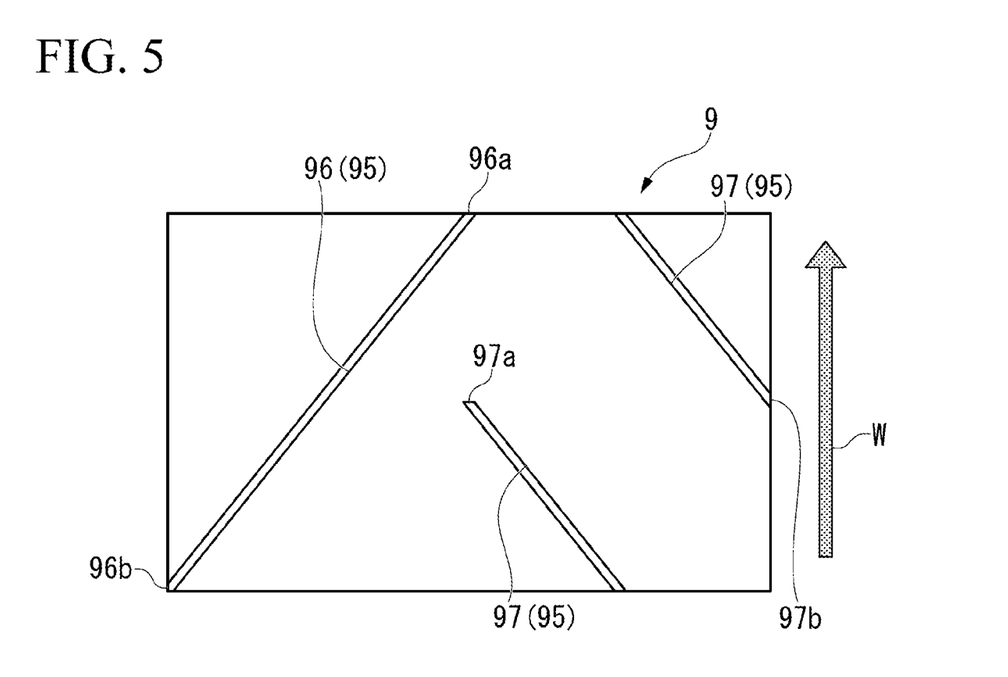
FIG. 5 is a developed view of an outer circumferential surface of the cylindrical body according to the first embodiment.

FIG. 5 is a developed view of the outer circumferential surface of the cylindrical body 9 according to the first embodiment.

The outer circumferential side flow path 95 has a first outer circumferential side flow path 96 formed on one side in the axial direction, and a second outer circumferential side flow path 97 formed on the other side in the axial direction.

The first outer circumferential side flow path 96 includes a middle section in the axial direction and is provided on one side of the middle section in the axial direction. The first outer circumferential side flow path 96 extends spirally from a starting point 96*a* to an end point 96*b*. The starting point 96*a* of the first outer circumferential side flow path 96 is provided on the middle section in the axial direction. The end point 96*b* of the first outer circumferential side flow path 96 is provided on an end portion on one side in the axial direction. As advancing from a downstream side toward an upstream side in the rotating direction (the direction of the arrow W in FIG. 5) of the rotor 3, the first outer circumferential side flow path 96 is inclined so as to be directed toward the end point 96*b* from the starting point 96*a*. The first outer circumferential side flow path 96 makes one round from the starting point 96*a* to the end point 96*b* in the circumferential direction.

At least a part of the second outer circumferential side flow path 97 is provided on the other side of the first outer circumferential side flow path 96 in the axial direction. In the embodiment, the second outer circumferential side flow path 97 includes a middle section in the axial direction and is provided on the other side of the middle section in the axial direction. The second outer circumferential side flow path 97 extends spirally from a starting point 97*a* to an end point 97*b*. The starting point 97*a* of the second outer circumferential side flow path 97 is provided on the middle section in the axial direction. The end point 97*b* of the second outer circumferential side flow path 97 is provided on an end portion on the other side in the axial direction. As advancing from a downstream side toward an upstream side in the rotating direction of the rotor 3, the second outer circumferential side flow path 97 is inclined so as to be directed toward the end point 97*b* from the starting point 97*a*. The second outer circumferential side flow path 97 makes one round from the starting point 97*a* to the end point 97*b* in the circumferential direction.

Next, a flow of the coolant S flowing through the rotor 3 will be described.

As shown in FIG. 1, first, the coolant S is supplied into the axial center cooling path 41 of the shaft 4 by a pump or the like (not shown) provided outside the rotor 3. The coolant S flows through the axial center cooling path 41 in the axial direction, and then, flows into the first flow paths 86 of the oil path plates 83 through the radial flow paths 42 due to a centrifugal force when the rotor 3 is rotated.

Some of the coolant S flowing into the first flow path 86 flows into the internal flow path 51 of the rotor core 5 through the second flow path 87. Further, the coolant S flows through the internal flow path 51 toward an outward side in the axial direction, and is discharged to the outside of the rotor 3 from the discharge holes 82 of the end plates 81. Accordingly, the coolant S cools the rotor core 5.

Meanwhile, as shown in FIG. 2, some of the residue of the coolant S flowing into the first flow path 86 flows through the first flow path 86 outward in the radial direction and is supplied to the outer circumferential section of the rotor 3. Specifically, the coolant S is supplied into the gap Q between the filament winding layer 7 and the cylindrical body 9. The coolant S supplied into between the filament winding layer 7 and the cylindrical body 9 flows toward an outward side in the circumferential direction and the axial direction through the inner circumferential side flow path 91 formed in the inner circumferential surface of the cylindrical body 9 while entering the cavity portions P between the filament fibers 71 neighboring in the axial direction and the cylindrical body 9 and flowing therethrough in the circumferential direction.

The coolant S flowing through the inner circumferential side flow path 91 outward in the axial direction is discharged to the outside form the end portion of the rotor core 5. Accordingly, the coolant S cools the permanent magnets 6 disposed inside the filament winding layer 7 and the filament winding layer 7 in the radial direction. In addition, some of the coolant S supplied to the outer circumferential section of the rotor 3 enters between the filament fibers 71. Accordingly, the coolant S cools the permanent magnets 6 from the outer circumferential section.

(Actions, Effects)

Next, actions and effects of the rotor 3 and the rotating electrical machine 1 will be described.

According to the rotor 3 of the embodiment, since the filament winding layer 7 is wound on the outer circumferential surfaces of the permanent magnets 6, the permanent magnets 6 can be held on the outer circumferential section of the rotor core 5. Since the cylindrical body 9 is further disposed on the outer circumferential section of the filament winding layer 7, fraying of the filament winding layer 7 can be minimized as the cylindrical body 9 holds the filament winding layer 7 from the outer circumference. Accordingly, the permanent magnets 6 can be more reliably fixed to the rotor core 5. In addition, a contact of the filament winding layer 7 with the stator 2 due to rotation of the rotor 3 can be reliably prevented. Accordingly, it is possible to provide the rotor 3 appropriate for a high rotation speed in comparison with the related art.

Since the plate member 8 has the first flow path 86, the coolant S flowing through the axial center cooling path 41 is supplied to the outer circumferential section of the rotor core 5 through the first flow path 86. Further, the coolant S supplied to the outer circumferential section of the rotor core 5 enters between the filament fibers 71 of the filament winding layer 7. Accordingly, the permanent magnets 6 disposed inside the filament winding layer 7 can be efficiently cooled from the outer circumferential section.

Accordingly, it is possible to provide the rotor 3 with an improved cooling efficiency while securely fixing the permanent magnets 6 disposed on the outer circumferential surface of the rotor core 5.

Since the inner circumferential side flow path 91 in communication with the first flow path 86 is provided in the inner circumferential section of the cylindrical body 9, the coolant S flowing through the axial center cooling path 41 is supplied to the inner circumferential side flow path 91 through the first flow path 86. Accordingly, the coolant S can be actively supplied between the cylindrical body 9 and the filament winding layer 7. Accordingly, the permanent magnets 6 disposed inside the filament winding layer 7 and the filament winding layer 7 can be efficiently cooled from the outer circumferential section.

Since the inner circumferential side flow path 91 is formed spirally, the coolant S supplied to the inner circumferential side flow path 91 is moved from one side toward the other side in the axial direction while moving in the circumferential direction due to rotation of the rotor 3. Accordingly, a distribution efficiency of the coolant S supplied to the inner circumferential side flow path 91 can be improved. Accordingly, a cooling efficiency of the rotor 3 can be improved.

Since the oil path plates 83 are disposed on the middle section of the rotor 3 in the axial direction, the coolant S is supplied to the outer circumferential section of the rotor 3 through the middle section of the rotor core 5. Meanwhile, as advancing from a downstream side toward an upstream side in a rotating direction of the rotor 3, inner circumferential side flow path 91 is inclined so as to direct toward an outside in the axial direction from a central section side in the axial direction. For this reason, the coolant S supplied to the inner circumferential side flow path 91 is moved outward from the side of the middle section of the rotor 3 along the inclination due to an inertial force according to rotation of the rotor 3.

Accordingly, the coolant S supplied to the middle section in the axial direction can be actively discharged outward in the axial direction by the oil path plates 83. Accordingly, a cooling efficiency of the rotor 3 can be improved.

Since the outer circumferential side flow path 95 formed spirally is provided in the outer circumferential section of the cylindrical body 9, for example, in the rotating electrical machine 1 using the rotor 3, the coolant S entering the air gap G between the rotor 3 and the stator 2 can be discharged to the outside of the air gap G along the outer circumferential side flow path 95.

Accordingly, it is possible to minimize occurrence of a friction torque of the rotating electrical machine 1 due to entering of the coolant S into the air gap G.

Since the inner circumferential side flow path 91 and the outer circumferential side flow path 95 are formed to be parallel to each other, in both of the inner circumferential section and the outer circumferential section of the cylindrical body 9, the coolant S can flow from the side of middle section in the axial direction outward in the axial direction due to rotation of the rotor 3. Accordingly, it is possible to provide a high performance rotor 3 in which a cooling efficiency of the rotor 3 is improved by improving a distribution efficiency of the coolant S of the inner circumferential side flow path 91, the coolant S inadvertently entering the air gap G is rapidly discharged to the outside of the air gap G by the outer circumferential side flow path 95, and occurrence of a friction torque in the rotating electrical machine 1 using the rotor 3 is suppressed.

Since the cylindrical body 9 is a non-magnetic body, a magnetic flux leakage can be minimized by providing the cylindrical body 9. Accordingly, it is possible to provide a high efficiency rotor 3 in which a decrease in magnetic efficiency is suppressed.

According to the rotating electrical machine 1 of the embodiment, it is possible to provide a high performance rotating electrical machine 1 including the rotor 3 with an improved cooling efficiency while reliably fixing the permanent magnets 6 disposed on the outer circumferential surface of the rotor core 5.

Second Embodiment

Figure 6:
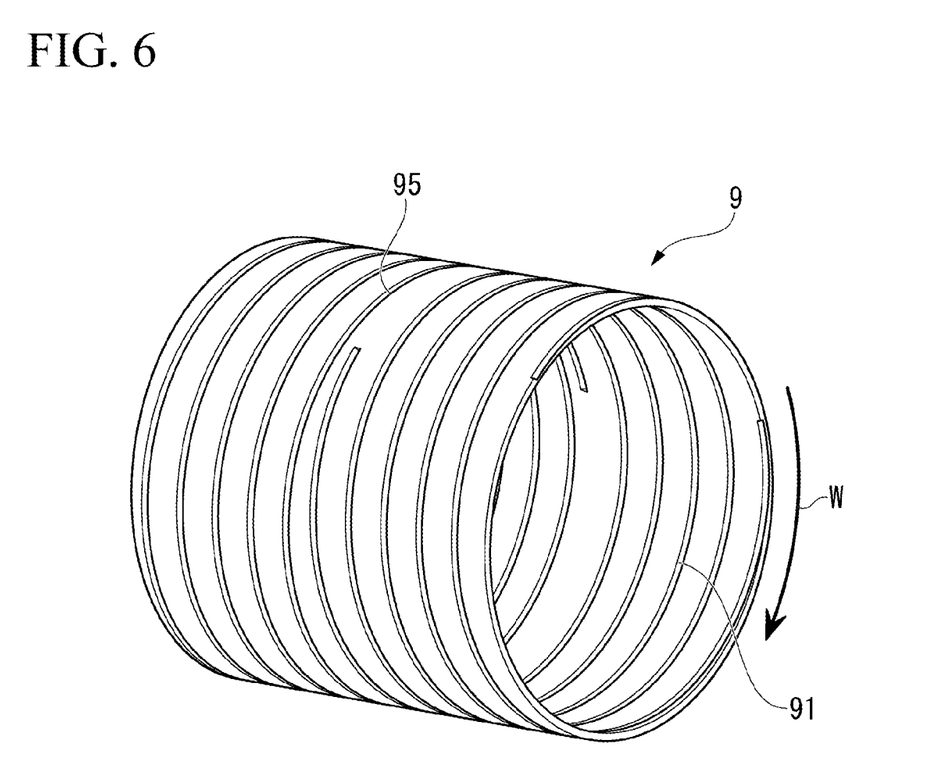
FIG. 6 is a perspective view of a cylindrical body according to a second embodiment.
Figure 7:
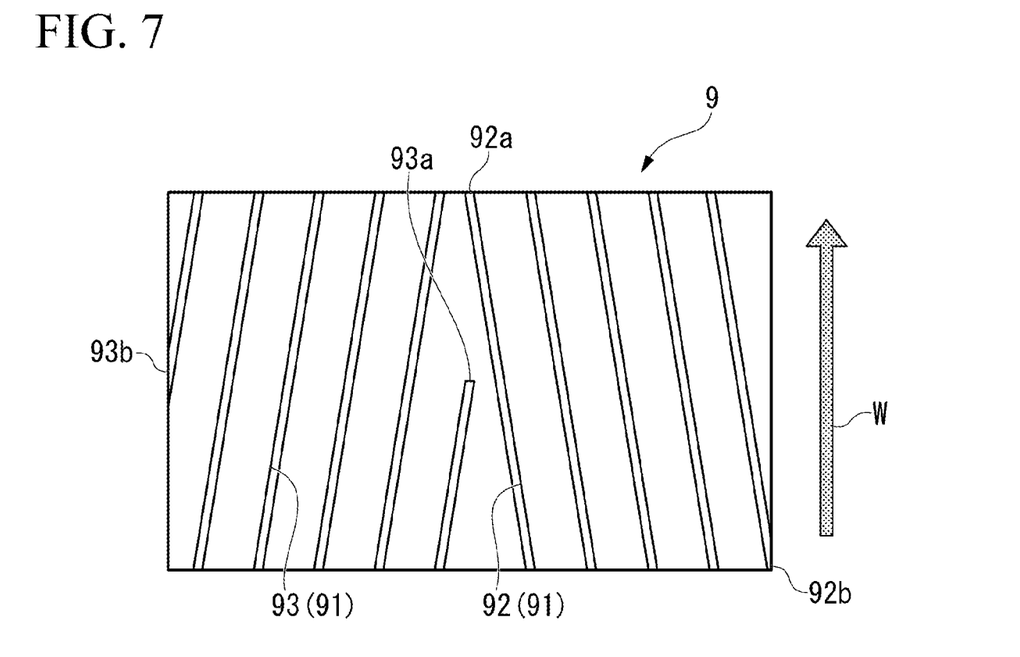
FIG. 7 is a developed view of an inner circumferential surface of the cylindrical body according to the second embodiment.

Next, a second embodiment according to the present invention will be described. FIG. 6 is a perspective view of the cylindrical body 9 according to the second embodiment. FIG. 7 is a developed view of an inner circumferential surface of the cylindrical body 9 according to the second embodiment.

Figure 8:
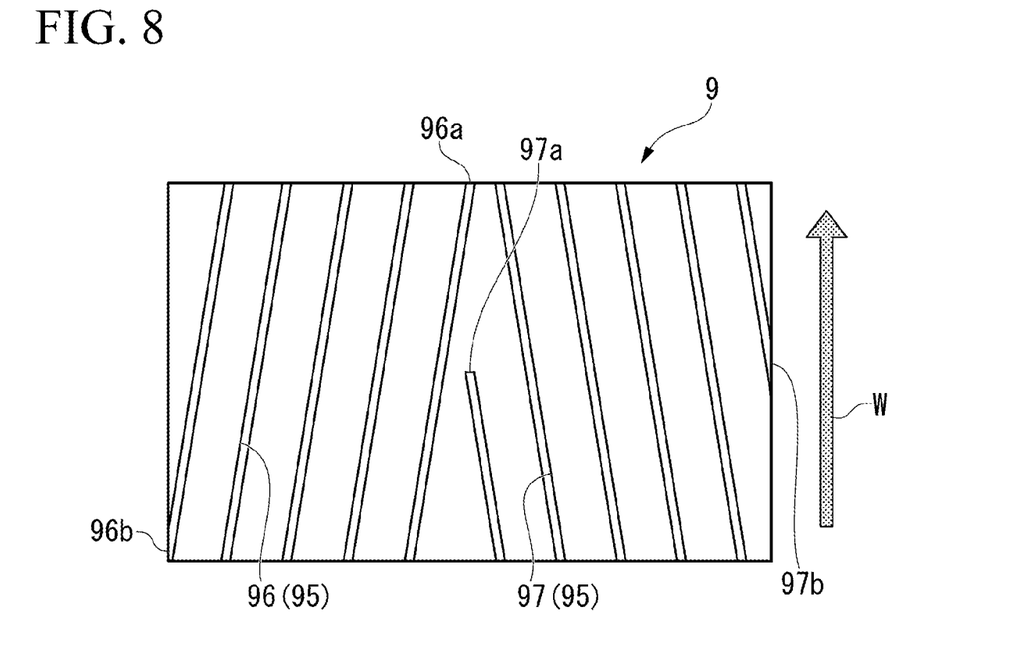
FIG. 8 is a developed view of an outer circumferential surface of the cylindrical body according to the second embodiment.

FIG. 8 is a developed view of an outer circumferential surface of the cylindrical body 9 according to the second embodiment. The embodiment is distinguished from the above-mentioned embodiment in that the inner circumferential side flow path 91 and the outer circumferential side flow path 95 make five rounds from the starting point to the end point in the circumferential direction.

In the embodiment, the inner circumferential side flow path 91 has the first inner circumferential side flow path 92 and the second inner circumferential side flow path 93. The first inner circumferential side flow path 92 makes five rounds from the starting point 92a to the end point 92b in the circumferential direction. The second inner circumferential side flow path 93 makes five rounds from the starting point 93a to the end point 93b in the circumferential direction.

The outer circumferential side flow path 95 has the first outer circumferential side flow path 96 and the second outer circumferential side flow path 97. The first outer circumferential side flow path 96 makes five rounds from the starting point 96a to the end point 96b in the circumferential direction. The second outer circumferential side flow path 97 makes five rounds from the starting point 97a to the end point 97b in the circumferential direction.

Further, since the inclination direction of the spiral and the positions of the starting points 92a, 93a, 96a and 97a and the end points 92b, 93b, 96b and 97b are the same as those in the first embodiment, descriptions thereof will be omitted.

According to the embodiment, in addition to exhibition of the same actions and effects as in the first embodiment, since the larger amount of coolant S can be held by the inner circumferential side flow path 91, a heat capacity of the cylindrical body 9 can be increased. Accordingly, heat of the permanent magnets 6 disposed on an inner diameter side of the filament winding layer 7 and the filament winding layer 7 in contact with the cylindrical body 9 can be efficiently absorbed, and a cooling efficiency of the rotor 3 can be improved.

Further, the technical scope of the present invention is not limited to the above-mentioned embodiments, and various modifications may be made without departing from the scope of the present invention.

For example, the number of rounds of the inner circumferential side flow path 91 and the outer circumferential side flow path 95 from the starting points 92a, 93a, 96a and 97a to the end points 92b, 93b, 96b and 97b are not limited to the above-mentioned number of rounds. The positions of the starting points 92a, 93a, 96a and 97a and the end points 92b, 93b, 96b and 97b in the axial direction are not limited to the above-mentioned embodiments. In addition, the inner circumferential side flow path 91 and the outer circumferential side flow path 95 may be a double spiral, a triple spiral, or the like.

The numbers of rounds of the inner circumferential side flow path 91 and the outer circumferential side flow path 95 may be different from each other. The inner circumferential side flow path 91 and the outer circumferential side flow path 95 may cross each other.

The outer circumferential side flow path 95 may not be required. However, the case in which the outer circumferential side flow path 95 is provided has an advantage over the case in which the outer circumferential side flow path 95 is not provided in that a decrease in performance of the rotating electrical machine 1 can be minimized as the coolant S entering the air gap G can be easily discharged to the outside.

The plurality of internal flow paths 51 in the rotor core 5 may be formed in the radial direction. In this case, the plurality of second flow paths 87 of the oil path plates 83 may be formed in the radial direction corresponding to the positions at which the internal flow paths 51 are formed.

The end plates 81 may be provided on only one side in the axial direction. In addition, the end plate 81 may not be provided.

In the embodiment, while the configuration in which the oil path plates 83 are provided on the middle section in the axial direction has been described, there is no limitation thereto. The oil path plates 83 may be provided on an end portion of the rotor core 5 on one side in the axial direction. That is, a configuration in which the coolant S flows through the inner circumferential side flow path 91 from one side toward the other side in the axial direction may be provided. In particular, when the oil path plates 83 are provided on the end portion of the rotor core 5 in the axial direction, the second inner circumferential side flow path 93 may not be provided.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A rotor comprising:
a rotor core;
a shaft that is configured to rotate integrally with the rotor core and that includes an axial center cooling path through which a coolant is able to flow;
a plate member having a first flow path which flows the coolant flowing through the axial center cooling path to an outer circumferential section of the rotor core;
a permanent magnet disposed on the outer circumferential section of the rotor core;
a filament winding layer wound on an outer circumferential section of the permanent magnet; and
a cylindrical body disposed on an outer circumferential section of the filament winding layer, wherein the filament winding layer is wound in a circumferential direction of the rotor core, and
an inner circumferential side flow path in communication with the first flow path is provided in an inner circumferential section of the cylindrical body.

2. The rotor according to claim 1, wherein the inner circumferential side flow path is formed in a spiral shape.

3. The rotor according to claim 1, wherein the plate member includes an oil path plate disposed in a middle section of the rotor in an axial direction, and
as advancing from a downstream side toward an upstream side in a rotating direction of the rotor, the inner circumferential side flow path is inclined so as to direct toward an outside in the axial direction from a central section side in the axial direction.

4. The rotor according to claim 1, wherein an outer circumferential side flow path formed in a spiral shape is provided in an outer circumferential section of the cylindrical body.

5. The rotor according to claim 4, wherein the inner circumferential side flow path and the outer circumferential side flow path are formed to be parallel to each other.

6. The rotor according to claim 1, wherein the cylindrical body is a non-magnetic body.

7. A rotating electrical machine comprising:
   the rotor according to claim 1; and
   a stator disposed on an outer circumferential section of the rotor.

\* \* \* \* \*